H. E. HAYWARD.
DRIVE CHAIN.
APPLICATION FILED JUNE 13, 1916.

1,223,972.

Patented Apr. 24, 1917.

Inventor-
Henry E. Hayward.
by his Attorneys.

UNITED STATES PATENT OFFICE.

HENRY E. HAYWARD, OF INDIANAPOLIS, INDIANA, ASSIGNOR TO LINK-BELT COMPANY, OF CHICAGO, ILLINOIS, A CORPORATION OF ILLINOIS.

DRIVE-CHAIN.

1,223,972.  Specification of Letters Patent.  Patented Apr. 24, 1917.

Application filed June 13, 1916. Serial No. 103,421.

*To all whom it may concern:*

Be it known that I, HENRY E. HAYWARD, a citizen of the United States, and a resident of Indianapolis, Indiana, have invented certain Improvements in Drive-Chains, of which the following is a specification.

My invention relates to certain improvements in drive chains of the side bar type in which the side bars, or side links, carry all of the load in tension. The bushings of the links have extended bearings which have full bearing upon the teeth of the sprocket wheel.

The object of my invention is to design the bushings so that they can be accurately machined and finished.

Figure 1:
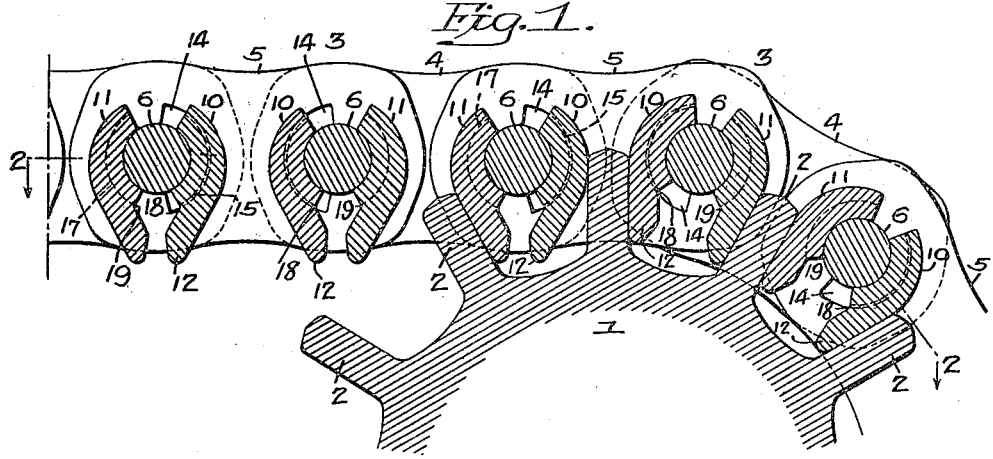
Figure 1 is a longitudinal sectional view through my improved chain on the line 1—1, Fig. 2, showing the relation of the chain bushings to the teeth of the sprocket wheel.
Figure 2:
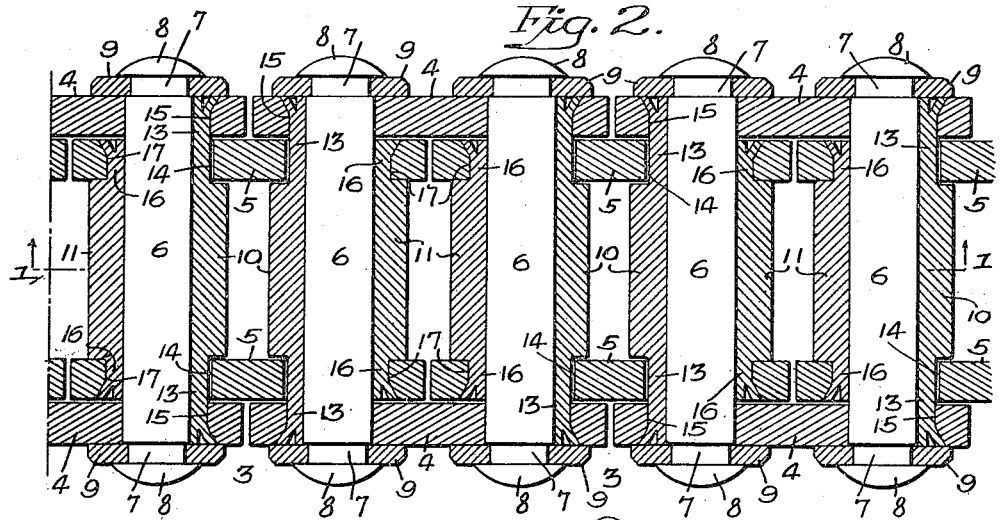
Fig. 2 is a longitudinal sectional view of the chain on the line 2—2 Fig. 1.
Figures 3, 4, 5:
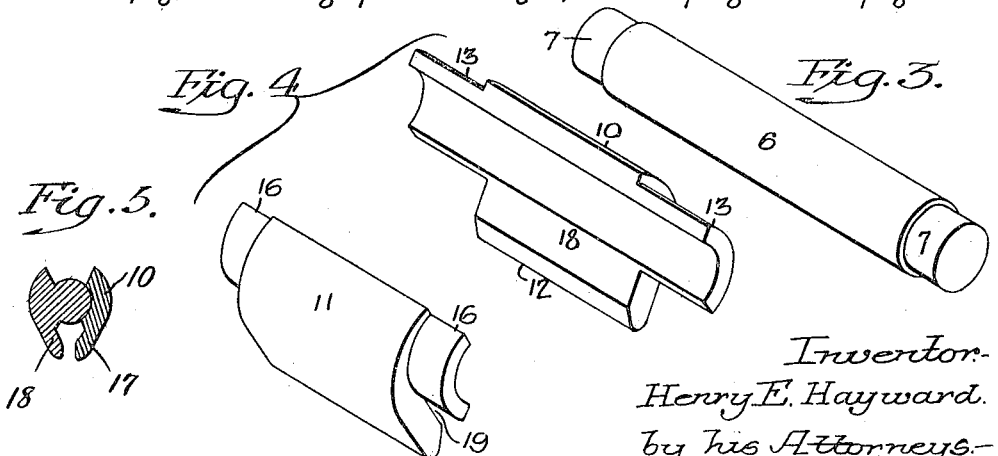
Fig. 3 is a detached perspective view of the pintle.
Fig. 4 is a detached perspective view of the two bushings.
Fig. 5 is a view illustrating a modification of the invention.

Referring to the drawings, 1 is the sprocket wheel having teeth 2. 3 is the chain composed of links 4 and 5 alternately arranged. 4, 4 are the outer links and 5, 5 are the inner links. 6, 6 are the pintles having heads 7 and 8. These pintles extend entirely through the links and pass through washers 9 formed in the ordinary manner. 10 is the bushing for the outer links and 11 is the bushing for the inner links. These bushings are made segmental, as shown in Fig. 4. The bushing 10 has a body portion forming a tooth 12 which engages the teeth of the sprocket wheel 2 and lateral extensions 13 which pass through slots 14 in the inner links 5 and into slots 15 in the outer links 4, as clearly shown in Fig. 2. The slots 15 are preferably countersunk, as shown, and the ends of the extensions 13 are shaped to conform to the slot in the link. In the arrangement illustrated in Fig. 2, the bushing 10 holds the outside links 4 from spreading. The bushing 11 has short lateral extensions 16, which enter slots 17 in the inner links 5. These slots are preferably countersunk and the extensions 16 are shaped to fit the countersunk slots. The shaping of the ends of the extensions 13 and 16 may be accomplished by displacing the metal, as illustrated in Fig. 2.

Thus it will be seen that the bushings 10 articulate with the outer links 4 and the bushings 11 articulate with the inner links 5. The pivot pin extends through openings formed in the two bushings and through the links, and each pivot pin is free to rotate independently of either bushing, but it holds the links laterally by means of the washers 9 and the heads 8 and forms the articulating surface for the two bushings. In the present instance, the portion 7 extending beyond the outer links 4 is reduced in diameter so as to form a shoulder for the washers so that they will not bind unduly on the links.

By this construction, each bushing has a surface arranged to engage the teeth of the sprocket wheel in the same manner that the chain of the silent type engages the teeth of the sprocket wheel. The pivot pins do not come in contact with the teeth of the sprocket wheel and as the bushings are provided with extensions 12, each bushing has considerable bearing upon each tooth of the sprocket wheel. In the present instance the bushings 10 are recessed at 18 and the bushings 11 are recessed at 19, so that the edges of the projecting portions of the lateral extensions of the bushings can be readily machined.

In some instances, the pivot pin may form an integral part of one of the bushings and the surface of articulation is then on one side only of the pin, that is, between the pin and the free bushing, see Fig. 5.

The shape of the sprocket teeth will depend materially upon the diameter of the wheel and the size of the chain which passes around the wheel.

I claim:—

1. The combination in a drive chain, of two bushings; links connected to the bushings, each bushing having a central bearing face and having lateral segmental extensions engaging the links, the center portion being recessed to allow the edge of the segmental extensions to be machined.

2. A bushing for a drive chain consisting of a central portion forming a bearing face and having lateral segmental extensions to engage the links of a drive chain and shaped to rotate on a pivot pin, the central portion being recessed so as to allow the edge of the segmental extensions to be machined.

HENRY E. HAYWARD.

Copies of this patent may be obtained for five cents each, by addressing the "Commissioner of Patents, Washington, D. C."